United States Patent
Blaas et al.

(10) Patent No.: US 9,824,160 B2
(45) Date of Patent: Nov. 21, 2017

(54) COMPUTER IMPLEMENTED METHOD AND DEVICE FOR ACCESSING A DATA SET

(71) Applicant: Synerscope B.V., Eindhoven (NL)

(72) Inventors: Jorik Blaas, Eindhoven (NL); Willem Robert Van Hage, Eindhoven (NL); Danny Hubertus Rosalia Holten, Eindhoven (NL)

(73) Assignee: SYNERSCOPE B.V., Eindhoven (NL)

( * ) Notice: Subject to any disclaimer, the term of this patent is extended or adjusted under 35 U.S.C. 154(b) by 157 days.

(21) Appl. No.: 14/293,602

(22) Filed: Jun. 2, 2014

(65) Prior Publication Data
US 2015/0347571 A1  Dec. 3, 2015

(51) Int. Cl.
*G06F 7/00* (2006.01)
*G06F 17/30* (2006.01)

(52) U.S. Cl.
CPC ............... *G06F 17/30973* (2013.01)

(58) Field of Classification Search
CPC ......... G06F 17/30696; G06F 2207/025; G06F 2207/226; G06F 12/0638; G06F 17/30973; G06F 17/30991; G06F 17/30997
USPC .......................... 707/722, 728, 737, 999.003
See application file for complete search history.

(56) References Cited

U.S. PATENT DOCUMENTS

| | | | | |
|---|---|---|---|---|
| 7,003,442 B1* | 2/2006 | Tsuda | ............... | G06F 17/30011 704/1 |
| 8,225,193 B1* | 7/2012 | Kleinschnitz | ..... | G06F 17/30716 715/205 |
| 9,165,556 B1* | 10/2015 | Sugar | ....................... | G10L 15/10 |
| 2004/0093523 A1* | 5/2004 | Matsuzaki | .............. | G06F 21/10 726/10 |
| 2005/0108001 A1* | 5/2005 | Aarskog | ............... | G06F 17/271 704/10 |
| 2007/0078832 A1* | 4/2007 | Ott, IV | ............ | G06F 17/30867 |
| 2007/0078889 A1* | 4/2007 | Hoskinson | ........ | G06F 17/30705 |
| 2007/0203996 A1* | 8/2007 | Davitz | .................. | H04L 12/588 709/206 |
| 2008/0072145 A1* | 3/2008 | Blanchard | ............... | G06F 17/22 715/273 |
| 2008/0092044 A1* | 4/2008 | Lewis | ............... | G06F 17/30722 715/713 |
| 2009/0182727 A1* | 7/2009 | Majko | ............... | G06F 17/30554 |
| 2009/0259647 A1* | 10/2009 | Curtis | ............... | G06F 17/30867 |
| 2009/0327120 A1* | 12/2009 | Eze | ....................... | G06Q 40/025 705/38 |
| 2010/0064231 A1* | 3/2010 | Gupta | ..................... | H04L 12/58 715/748 |
| 2010/0174743 A1* | 7/2010 | Komano | ........... | G06F 17/30398 707/769 |

(Continued)

*Primary Examiner* — Mohammed R Uddin
(74) *Attorney, Agent, or Firm* — Kenealy Vaidya LLP

(57) ABSTRACT

A computer implemented method of accessing a data set comprising a plurality of records, wherein each record is associated with one or more items of data. The method comprises using the computer to receive a data query on the data set. Each record is assigned to an in-group or to an out-group with respect to the query. Words appearing in records of the in-group are determined and a user interface representative of said words is generated. Words appearing in records of the out-group are determined and a user interface representative of said words is generated.

11 Claims, 13 Drawing Sheets
(12 of 13 Drawing Sheet(s) Filed in Color)

(56) References Cited

U.S. PATENT DOCUMENTS

| | | | |
|---|---|---|---|
| 2010/0241507 A1* | 9/2010 | Quinn | G06Q 30/02 705/14.42 |
| 2010/0250340 A1* | 9/2010 | Lee | G06Q 10/06 705/310 |
| 2011/0190035 A1* | 8/2011 | Vanden Heuvel | G06F 17/30713 455/566 |
| 2011/0282919 A1* | 11/2011 | Sweeney | G06F 17/30716 707/805 |
| 2012/0036149 A1* | 2/2012 | Tsuboi | G06F 17/30696 707/769 |
| 2012/0084149 A1* | 4/2012 | Gaudiano | G06Q 30/0256 705/14.54 |
| 2012/0110515 A1* | 5/2012 | Abramoff | G06F 17/30994 715/854 |
| 2012/0239682 A1* | 9/2012 | Wedeniwski | G06F 17/30663 707/769 |
| 2013/0212087 A1* | 8/2013 | Chitiveli | G06F 17/30991 707/722 |
| 2014/0101159 A1* | 4/2014 | Lloyd | G06F 17/30976 707/737 |
| 2014/0207779 A1* | 7/2014 | Bostick | G06F 17/30911 707/737 |
| 2014/0282244 A1* | 9/2014 | Speer | G06F 3/04842 715/811 |
| 2015/0278901 A1* | 10/2015 | Windemuth | G06F 19/324 705/26.5 |
| 2015/0346955 A1* | 12/2015 | Fundament | G06F 3/04847 715/765 |

\* cited by examiner

| Record # | Content | Items of data | identifiers |
|---|---|---|---|
| 0 | One is a document | {one, is, a, document} | [1, 2, 3, 4] |
| 1 | One is one document | {one, is, document} | [1, 2, 4] |
| 2 | This is a document | {this, is, a, document} | [0, 2, 3, 4] |
| 3 | This is one too | {this, one, is, too} | [0, 1, 2, 5] |

Figure 13A

| Concordance |
|---|
| {this, one, is, a, document, too} |
| [0, 1, 2, 3, 4, 5] |

Figure 13B

| Concordance | 0 | 1 | 2 | 3 | 4 | 5 |
|---|---|---|---|---|---|---|
|  | this | one | is | a | document | too |
| Record # |  |  |  |  |  |  |
| 0 | 0 | 1 | 1 | 1 | 1 | 0 |
| 1 | 0 | 1 | 1 | 0 | 1 | 0 |
| 2 | 1 | 0 | 1 | 1 | 1 | 0 |
| 3 | 1 | 1 | 1 | 0 | 0 | 1 |

Figure 13C

| Group | Record# | Content | Items of data | identifiers |
|---|---|---|---|---|
| out | 0 | One is a document | {one, is, a, document} | [1, 2, 3, 4] |
| out | 1 | One is one document | {one, is, document} | [1, 2, 4] |
| in | 2 | This is a document | {this, is, a, document} | [0, 2, 3, 4] |
| in | 3 | This is one too | {this, one, is, too} | [0, 1, 2, 5] |

Figure 13D

| Concordance | 0 | 1 | 2 | 3 | 4 | 5 |
|---|---|---|---|---|---|---|
|  | this | one | is | a | document | too |
| Group |  |  |  |  |  |  |
| in ($I_1$) | 2 | 1 | 2 | 1 | 1 | 1 |
| out ($I_2$) | 0 | 2 | 2 | 0 | 2 | 0 |
| S | 1.4 | -0.6 | 0 | 1 | -0.6 | 1 |

Figure 13E

COMPUTER IMPLEMENTED METHOD AND DEVICE FOR ACCESSING A DATA SET

FIELD OF THE INVENTION

The present invention concerns a data analysis system. More in particular the invention relates to a computer implemented method and a system for ranking items of data included in records in a database.

BACKGROUND TO THE INVENTION

These days much data is generated and stored in digital form. Since the 1980s the world's capacity to digitally store information has increased by over twenty percent per year. In 2012 every day 2.5 exabytes ($2.5 \times 10^{18}$) of data were created. Some parts of this data is publicly available, other parts are in company data.

The term 'big data' is often used in this connection for a collection of data so large and complex that it becomes difficult to process using on hand database management tools or traditional data processing applications.

Much of this data is stored in large databases, sometimes referred to as data warehouses. Such databases can store millions or even billions of records. Each record can be associated with thousands of items of data.

There is a general need to be able to query databases to uncover records that correspond to a predetermined content, e.g. to determine which records contain certain items of data. However, with the explosive growth of the number of data records it becomes increasingly difficult to determine queries that properly yield records that provide the desired information. It will be clear that a query yielding a large number of records still leaves the user in doubt as to which record are more or less relevant.

Therefore, there is a specific need to efficiently and intuitively query databases. It is also of great importance to be able to perform queries in real time, i.e. with minimal delay. Delay times are often seen as a severe hindrance in querying, and may dissuade people from continued querying of a database. In other words, people simply give up and stop querying if delay times are perceived as annoying. In present times of relatively fast computing, delay times of as little as a few tenths of a second can already be perceived as prohibitively annoying.

SUMMARY OF THE INVENTION

In accordance with a first aspect of the present invention there is provided a computer implemented method of accessing a data set comprising a plurality of records, wherein each record is associated with one or more items of data. The method comprises using the computer to receive a data query on the data set and assigning each record to an in-group or to an out-group with respect to the query. Thus the data set can be divided into an in-group and an out-group. The computer determines words appearing in records of the in-group and generates a user interface representative of said words. The computer also determines words appearing in records of the out-group and generates a user interface representative of said words. Words can be nouns, verbs, adjectives, etc. as encountered in text documents. Words can also be identifiers, names, metadata, dates, flags, tags, derived data, numerical values or bandings etc. More in general, words are anything which can be represented as text, including items of data extracted from the records which are actual words, text labels assigned to or calculated from data included in the records—e.g. high-income or 30,000 or some_kind_of_ data_label.

According to an aspect, the computer is used to determine a first plurality of words having a high discriminative power favoring records of the in-group and to determine a second plurality of words having a high discriminative power favoring in records of the out-group. The computer can generate a user interface representative of said first and second plurality of words. A high discriminative power for records of the in-group indicates word having a high likelihood of occurring in a record of the in-group and a low likelihood of occurring in a record of the out-group. The higher the difference in the likelihoods, the higher the discriminative power. The difference can be related to an absolute difference of numbers of occurrences of the word in the in-group and in the out-group. This takes into account that words that hardly occur in the out-group and only a few times in the in-group may have a high relative likelihood of occurring in the in-group, but are less efficient for positively identifying records as being comprised in the in-group. Similarly, a high discriminative power for records of the out-group indicates word having a high likelihood of occurring in a record of the out-group and a low likelihood of occurring in a record of the in-group. The higher the (absolute) difference in the likelihoods, the higher the discriminative power. Providing a selection of words in the in-group provides the advantage that the user is enabled to select a different query item, related to the previous query item. The user needs no personal knowledge to identify such related query item, as the system extracts the potential query items from the records. Also, the need to type a new query item may be obviated as the user only needs to select a further query item. Providing a selection of words in the out-group provides the advantage that the user is immediately made aware of what else is contained in the records beside his initial query. The user can instantly see what is background or opposite to his previous query. This greatly enhances efficiency of a query session. This also increases the chances of finding hard to uncover details in the records that otherwise would easily be missed.

In accordance with a further aspect, the user interface includes a first view comprising data representative of the first and second group, and the user interface includes at least one further view comprising data representative of data representative of the records in different formats. The further views can e.g. provide geographical information relating to the records, temporal information relating to the records, or relational information relating to the records. This provides increased understanding of the nature and content of the records.

In accordance with a further aspect, the views are coupled, so as to allow user selection of an item of data as input for a query in any view. The data query on the data set can include selection of one or more data items in the first view or one of the at least one further views. The remaining views are updated to reflect the selected item of data. As such, the invention fuses analytics and search.

In accordance with a further aspect, upon user selection of an item of data for a query, all views are updated upon user selection of one or more items of data in one of the views. All views can be instantaneously updated to reflect the selected item of data. This provides smooth user experience and enhances a flow of querying.

In accordance to a further aspect, a computer implemented method of accessing a data set comprising a plurality of records, wherein each record is associated with one or more items of data is provided. The method comprises using the computer to receive a data query on the data set. Each record is assigned to a first group or to a second group. Items of data appearing in records of the first group are determined and a user interface representative of said items of data is generated. Items of data appearing in records of the second group are determined and a user interface representative of said items of data is generated.

In accordance with a further aspect, the items of data relate to text, e.g. words or groups of words, images, image fragments moving images, audio fragments, numbers, chemical formula fragments, chemical formulae, mathematical formula fragments, and/or mathematical formulae.

According to a further aspect a computer implemented method of generating a user interface comprising data representative of a reference item of data included in a record in a data set comprising a plurality of records is provided. The method comprises using the computer to determine items of data appearing in records including the reference item and generating a user interface representative of said items of data. The method further includes determining items of data appearing in records not including the reference item and generating a user interface representative of said items of data.

In accordance with a further aspect, the items of data relate to text, e.g. words, images, moving images, and/or audio. E.g. for images an image cloud could be represented or alternatively the word cloud could be a list of tags of metadata for the images (or moving images). Similarly, for audio a cloud or list of tags or metadata for the audio could be presented.

According to a further aspect, a data processing system for ranking items of data is provided.

According to a further aspect, a computer readable medium storing computer implementable instructions which when implemented by a programmable computer cause the computer to perform the method according to the invention is provided.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee. Embodiments of the present invention will now be described in detail with reference to the accompanying drawings in which:

FIGS. 13A-13E are schematic representations of a simplified example of determining a score.

DETAILED DESCRIPTION

Figure 1:
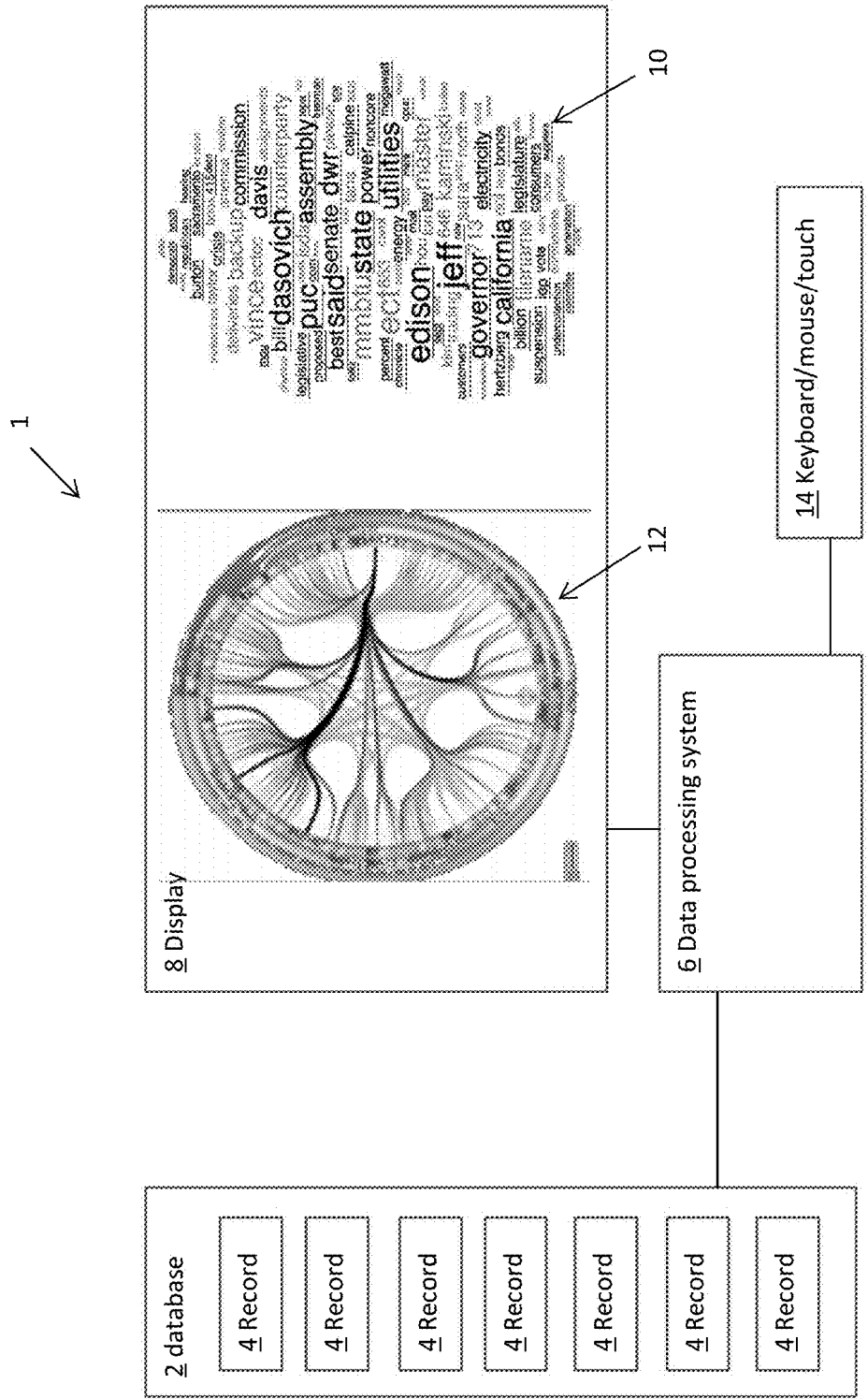
FIG. 1 is a schematic block diagram of a system in accordance with an embodiment of the present invention.

FIG. 1 shows a schematic block diagram of a system 1 in accordance with an embodiment of the present invention. The system 1 includes a database 2. The database 2 includes a plurality of records 4. The records can for instance include texts, images, video fragments, audio fragments etc. Each record 4 is associated with one or more items of data. The items of data can e.g. be text items, such as words or phrases, included in the record 4. Words can also be identifiers, names, metadata, dates, flags, tags, derived data, numerical values or bandings, timestamps etc. The items of data can also be images, such as moving images, or fragments thereof. The items of data can also be geographical data, temporal data, connectivity data, etc.

The system 1 further includes a data processing system 6 in communication with the database 2. The system 1 further includes a display 8 in communication with the data processing system 6. The data processing system 6 is arranged for generating data representing a user interface. The user interface is displayed on the display 8. In FIG. 1 the user interface includes a first view 10 including a dual word cloud containing items of data of records 4 of the database 2. The dual word cloud includes a first plurality of words relating to an in-group of records that comply with a particular query. The dual word cloud also includes a second plurality of words relating to an out-group of records that do not comply with said query. In this particular example the records relate to email messages and the word cloud includes items of data in the form of words appearing in the emails as described in U.S. patent application Ser. No. 13/102,648 published as US2012/284155 incorporated herein by reference. The senders and recipients of the email messages in the database are represented by positions around the edge of the circle and the existence of an email message is shown by the presence of a line connecting the points associated with a sender and the recipient(s). In FIG. 1 the user interface includes a second view 12 including a circular representation of items of data of records 4 of the database 2. In this particular example the circular representation includes items of data in the form of sender-recipient relationships in the emails. The system 1 further includes an input unit, such as a keyboard, mouse and/or touch unit 14 in communication with the data processing system 6.

As will be described below, the user interface, especially the dual word cloud, allows for highly efficient browsing through the records of the database 2. Also, the user interface provides a transparent and intuitive way of browsing. Further, as will be described below, the user interface assists in refining a query of the database. Thereto, the data processing system can propose items of data that have high discriminative power favoring in-group records that comply with the present query. As will be highlighted below, the data processing system can also propose items of data that have high discriminative power favoring out-group records that do not comply with the present query. Items of data having a high discriminative power favoring in-group records are items of data that have a high likelihood of occurring in an in group record and a low likelihood of occurring in an out group record. Items of data having a high discriminative power favoring out-group records are items of data that have a high likelihood of occurring in an out group record and a low likelihood of occurring in an in group record.

In FIG. 1 the word cloud includes both words having high discriminative power for in-group records and words having high discriminative power for out-group records. It has been found that the user interface including items of data having high discriminative power for in-group records and items of data having high discriminative power for out-group records increases the efficiency of browsing through the database. It, inter alia, provides insight into what has been selected by the present query versus what other information is contained in the database. It can also help identify what information (e.g. which items of data) relate to background information rather than to foreground information that has been selected by the user. Knowledge of background information also aids in quickly focusing a query towards a desired result.

Figure 2:
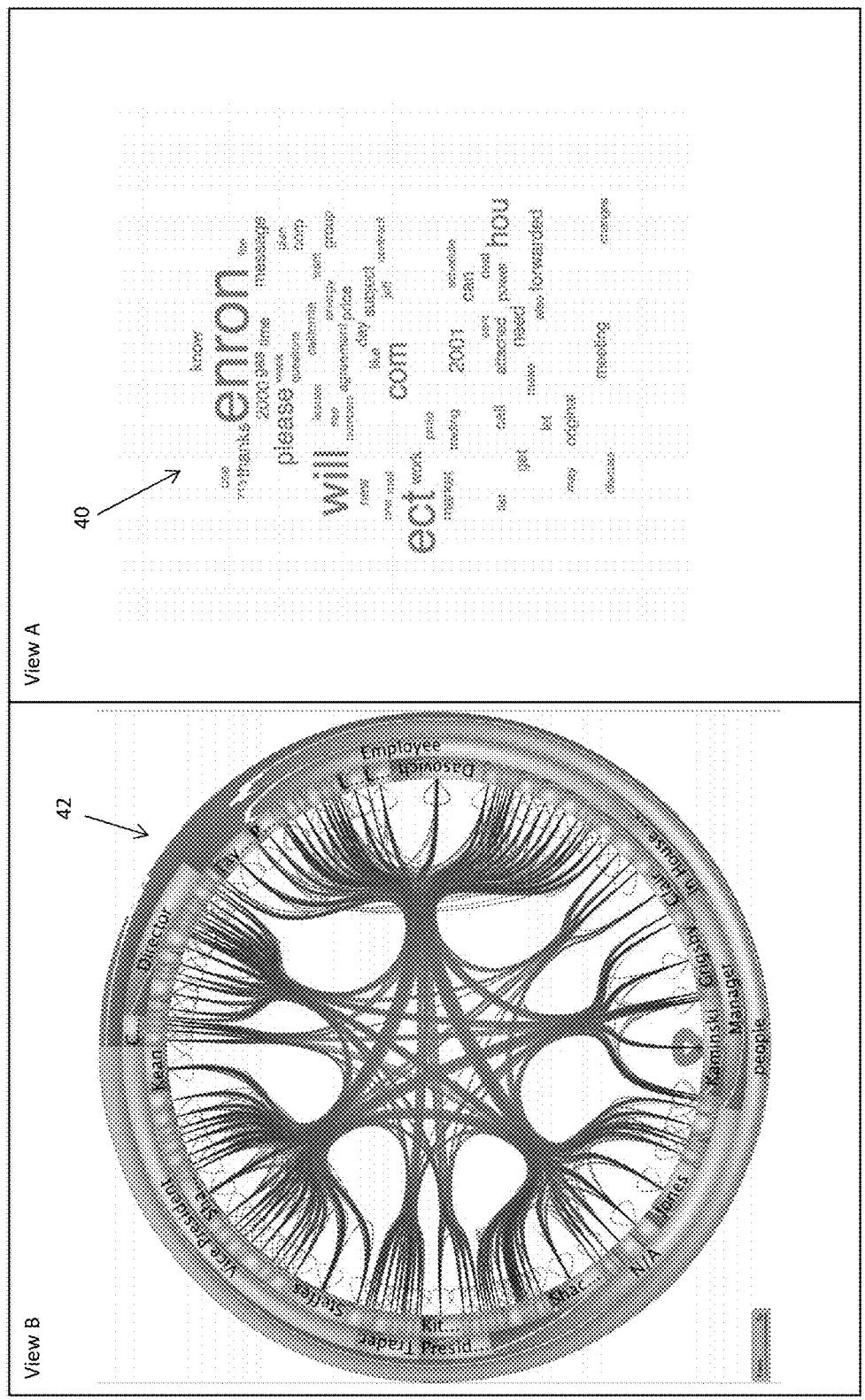
FIG. 2 is a schematic representation of a user interface in accordance with an embodiment of the invention.

FIG. 2 shows a schematic example of a user interface in an initial state. This example relates to a database 2 including a large number of records 4 in the form of email messages. The email messages contain items of data in the form of text. The items of data include text, such as words, encountered in the body text of the email messages. The items of data also include text in the form of sender names, recipient names, addresses, dates, times, flags ("private", "confidential", "request read receipt", etc.). The items of data can also include text, such as words, included in attachments to the email messages, etc. The text relating to the email message can also be metadata, for instance that that the email message had been marked as junk email, the message has not been read, the message has been recalled, or the like. In the exemplary initial state the forty words occurring most frequently in the records are displayed in view A in the form of a word cloud 40.

In a second view B the user interface displays data representative of the records in a different format. In FIG. 2 view B presents data representative of all records in the database. View B presents data representing the combination of sender and recipient(s) of each email in the database represented as a line in the circular graph. The circumference of the circular graph in view B represents items of data relating to email users (senders and receivers) of the email messages in the database. Interactions between the email users are represented as lines connecting a sender with one or more receivers of the associated email message, as described in WO2012/152726 and US2014/0132623, both incorporated herein by reference.

In the initial state shown in FIG. 2 a user query 200 may be performed on the database. Thereto a user selects an item of data by means of an input unit 28. The input unit may be a keyboard, mouse, touchpad, touch functionality of a touch screen, microphone, camera or the like. The item of data may be selected 204 from the first view A or may be selected 202 from the second view B. FIG. 2 shows an example of performing a query by selecting 202 an item of data from view B. In the example the selection concerns the emails sent to or from a particular person, indicated in black at 44.

In response to receipt of the user selection, the data processing system 6 processes 206 the user selection. Thereto, the data processing system determines the item of data or items of data associated with the user selection. In this example, the data processing system 6 determines the word, here the name, associated with the sender of the selected stream of email messages. This selection of items of data forms the user query to be performed on the records 4 in the database 2.

For performing the user query, the data processing system 6 assigns 302 each record 4 to a first group of records or to a second group of records. Here the first group constitutes an in-group, i.e. a group of records that complies with the user query. Here the in-group contains the records that comprise the selected items(s) of data, i.e. the name of the sender. It will be appreciated that it is not necessary that all records indicate the selected item of data as the sender of that particular email message. Also records containing the selected item of data as recipient, or as part of the content of the email message, will form part of the in-group. Here the second group constitutes an out-group, i.e. a group of records that does not comply with the user query. Here the out-group contains the records that do not comprise the selected items(s) of data. Hence, in this example the records of the database are divided into an in-group and an out-group.

Next, the data processing system 6 determines a first plurality of items of data, here words, appearing in records of the in-group, a second plurality of items of data, here words, appearing in records of the out-group. In this example, the first plurality of words consists of the words that have the highest discriminative power for records of the in-group. In this example, the second plurality of words consists of the words that have the highest discriminative power for records of the out-group. The data processing system 6 generating a user interface representative of the first plurality of items of data and the second plurality of items of data. In the user interface, the items of data of the first plurality are distinguishable from the items of data of the second plurality. The distinguishability may e.g. be given by presenting the first and second pluralities in different colors, fonts, underlined or not, etc.

Figure 3:
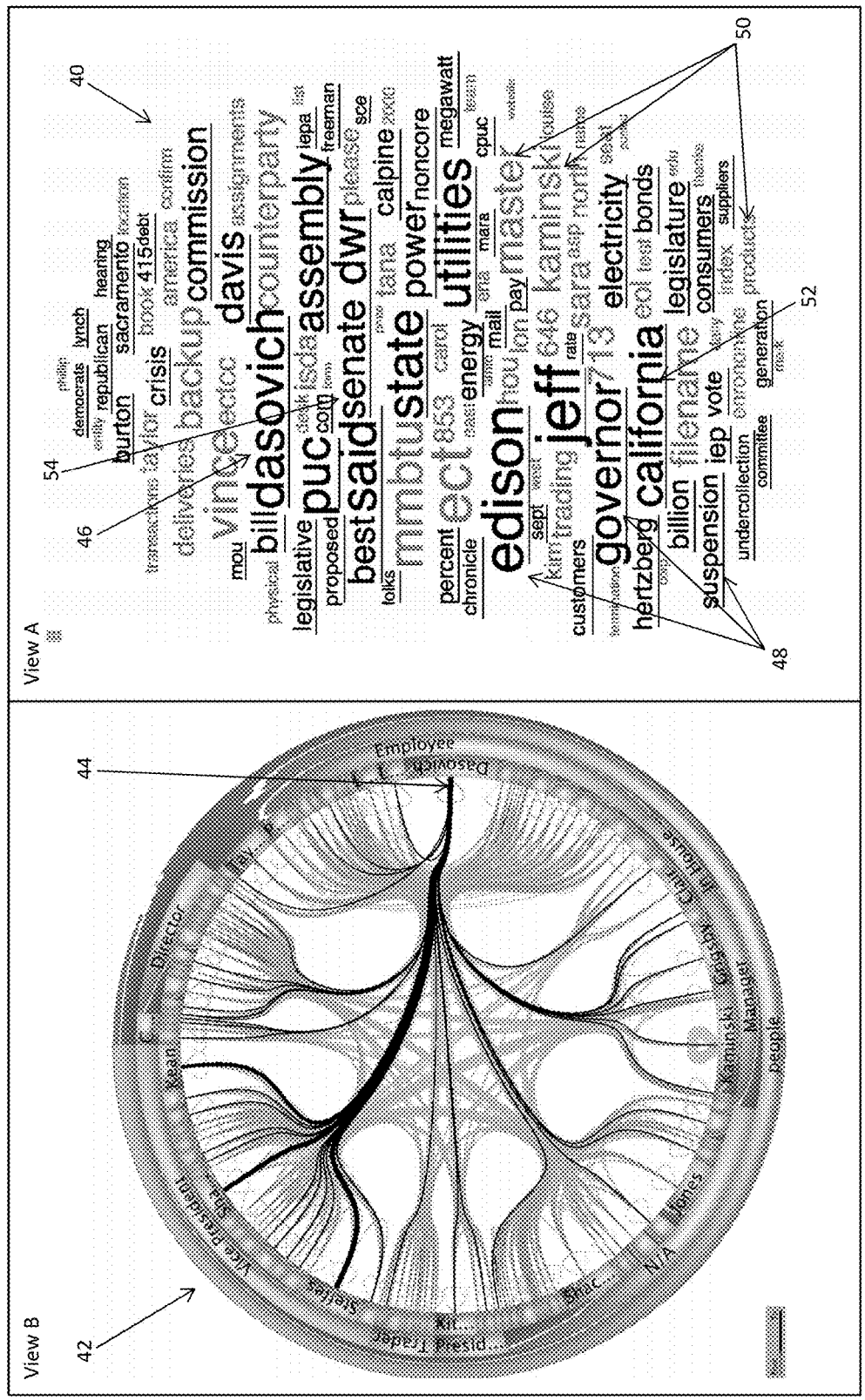
FIG. 3 is a schematic representation of a user interface in accordance with an embodiment of the invention.

Upon the user selection in view of the query both views A and be can be updated. In FIG. 3 the first view A shows the first plurality 48 of items of data, here the top twenty words (underlined), and the second plurality 50 of items of data, here the bottom twenty words (not underlined). The first and second plurality are visualized as a word cloud 40. It will be appreciated that the selected item of data (selected at 44 in view B of FIG. 3) is also among the first plurality of items of data as indicated at 46, viz. the word (name) "dasovich". It will be appreciated that the word cloud 40 can be constructed to provide an indication of the discriminative power. In this example a font size of the items of data (words) in the word clouds is scaled according to the discriminative power (for the in-group or the out-group) associated with the respective item of data. It is also possible the word cloud 40 can be constructed to provide an indication of an average distance between two items of data of one group within the texts of the records of that group. In this example a distance in between two items of data (words) in the word clouds is scaled according to an average distance between said two items of data within the corresponding records.

FIG. 3 showed a user selection in the second view B resulting in a word cloud 40 containing items of data from the in-group as well as items of data from the out-group.

Figure 4:
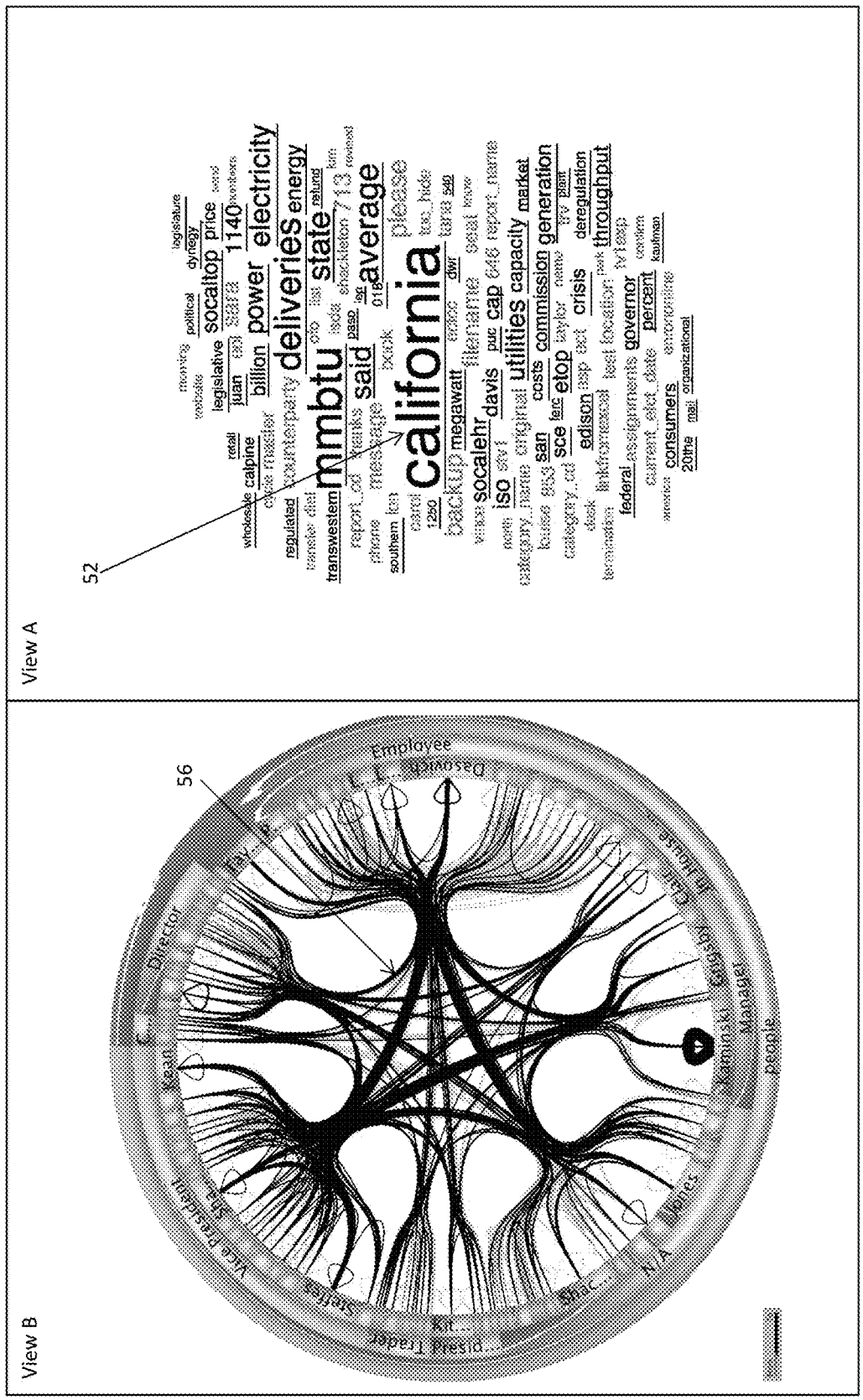
FIG. 4 is a schematic representation of a user interface in accordance with an embodiment of the invention.

It is also possible to select an item of data in the first view A. FIG. 4 shows an example of a user interface when in the first view A of FIG. 3 the item of data "california" is selected at 52. Similarly as described above, the data processing system 6 assigns 302 each record 4 to a first group of records or to a second group of records. Here the first group constitutes the in-group, i.e. the group of records including the word "california". Here the second group constitutes the out-group, i.e. the group of records not including the word "california". With the records re-assigned to the first and second groups, the discriminative power for each item of data can be determined. FIG. 4 shows in the first view A a word cloud including the redetermined first and second pluralities of items of data. Simultaneously, the second view B is updated. The selected item of data "california" is used to determine all email messages including the word "california". The graphical representation of these email messages is shown in black at 56 in the second view B of FIG. 4 in accordance with US2014/0132623, incorporated herein by reference.

Figure 5:
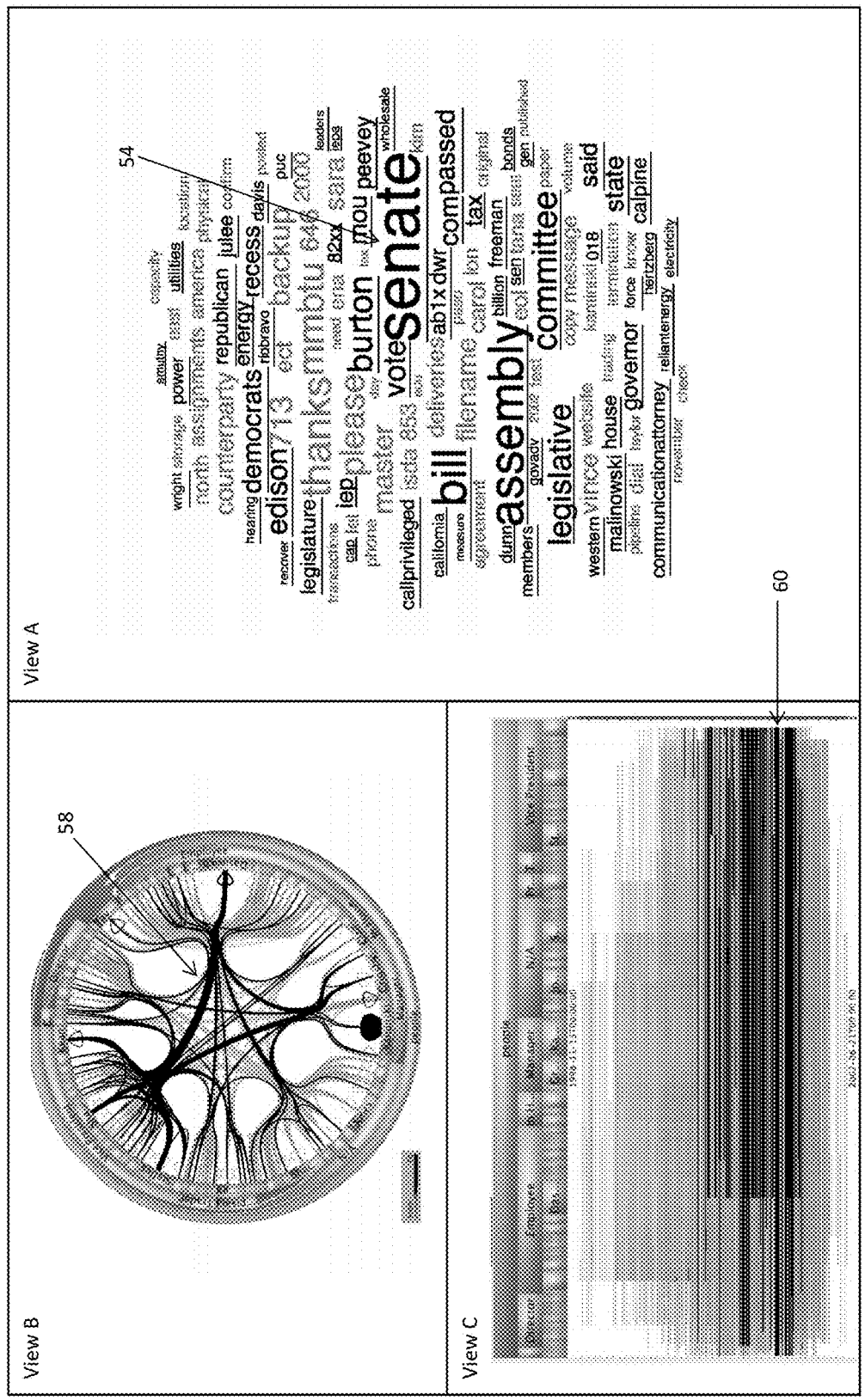
FIG. 5 is a schematic representation of a user interface in accordance with an embodiment of the invention.

FIG. 5 shows an example of a user interface when in the first view A of FIG. 3 the item of data "senate" is selected at 54. Similar as explained in relation to FIG. 4 the first view A is updated due to the selection of the item of data "senate". Similarly, the second view B is updated in accordance with US2014/0132623. The update indicates the records including "senate" in black at 58. The example of FIG. 5 includes a third view C. In this third view C the user interface displays data representative of the records in yet a different format. In FIG. 5 view C presents data representative of a distribution of email messages as a function of time. In horizontal direction the sender-recipient interactions of the records are shown. Horizontal lines represent connections from a sender to a recipient for the records in the database. The senders and recipients are indicated at the top of the graph. In the vertical direction it is indicated at which moment in time the email message was sent. View C is updated in view of the selected item of data "senate" as described in US2014/0059456, incorporated herein by reference. The update indicates the records including "senate" in black at 60.

It will be appreciated that in the example of FIGS. 2-5 the multiple views, and the possibility to select items of data for querying the database provides highly useful possibilities for interactively querying the database. It is for example possible to select a word, such as "california" as shown above and instantaneously see the email paths (sender-recipient) that have an occurrence of said word, and simultaneously and instantaneously see the temporal changes in the occurrence of the word in the records. From this the user can continue by selecting the email paths just indicated as relevant in view of "california" occurring in the records, and see in the first view words related to these email paths. This may initiate a query based on another word than "california". Alternatively, the user could continue by selecting a time slot indicated as relevant in view of "california" occurring in the records, and see in the first view words related to this time slot. This may initiate a query based on yet another word than "california". Also, the first view provides insight in other words that have a high discriminative power for records including the word "california", which can be selected for further querying. Further, the first view provides insight in other words that have a high discriminative power for records not including the word "california". These too may be used as user selection for further querying. As such, the invention fuses analytics and search. It has been found that in queries that are aimed at uncovering hard-to-find information the out-group information can be particularly useful in arriving at query items that lead to the desired results. Moreover, as will be appreciated from the above, the entire querying can be performed without typing a single word. This is very useful in preventing writer's block from keeping a user from querying the database.

Figure 6:
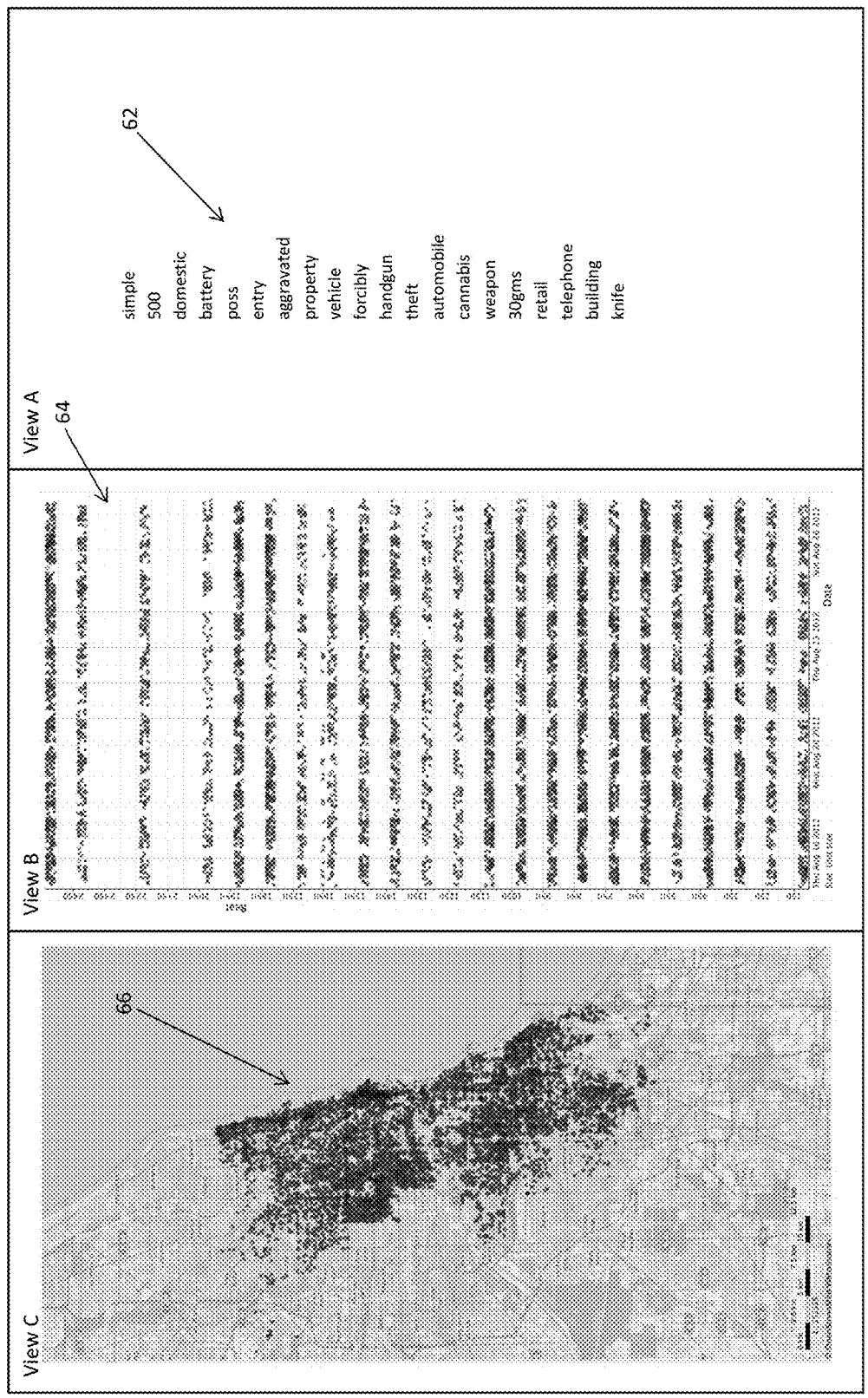
FIG. 6 is a schematic representation of a user interface in accordance with an embodiment of the invention.

FIGS. 6-9 relate to a further example. FIG. 6 shows a schematic example of a user interface in an initial state. This example relates to a database 2 including a large number of records 4 in the form of police reports. The police reports contain items of data in the form of text. The items of data include text, such as words, encountered in the body text of the police reports. The items of data also include text in the form of police officer identification, names, addresses, dates, times, etc. In this example the twenty most frequently occurring words are displayed in view A in the form of a list 62 of words. In this example the list 62 is an ordered list. The most frequently occurring item of data is here positioned at the top of the list, the next most frequently occurring item of data at the next position, and so on.

In a second view B the user interface displays data 64 representative of the records in a different format. In FIG. 6 view B presents data 64 representative of a distribution of police reports as a function of time. It will be appreciated that the records thereto include items of data relating to time. In vertical direction a numerical index of the records is shown. In this example the numerical index is representative of a police route corresponding to the report. In the horizontal direction it is indicated at which moment in time the police report was filed.

In a third view C the user interface displays data 66 representative of the records in yet a different format. In FIG. 6 view C presents data 66 representative of all records in the database. In this example the records include data representative of a geographical location. View C presents data representing for each record in the database the geographical location associated with that record represented as a dot on a representation of a map as described in U.S. patent application Ser. No. 14/215,238, incorporated herein by reference.

Figure 7:
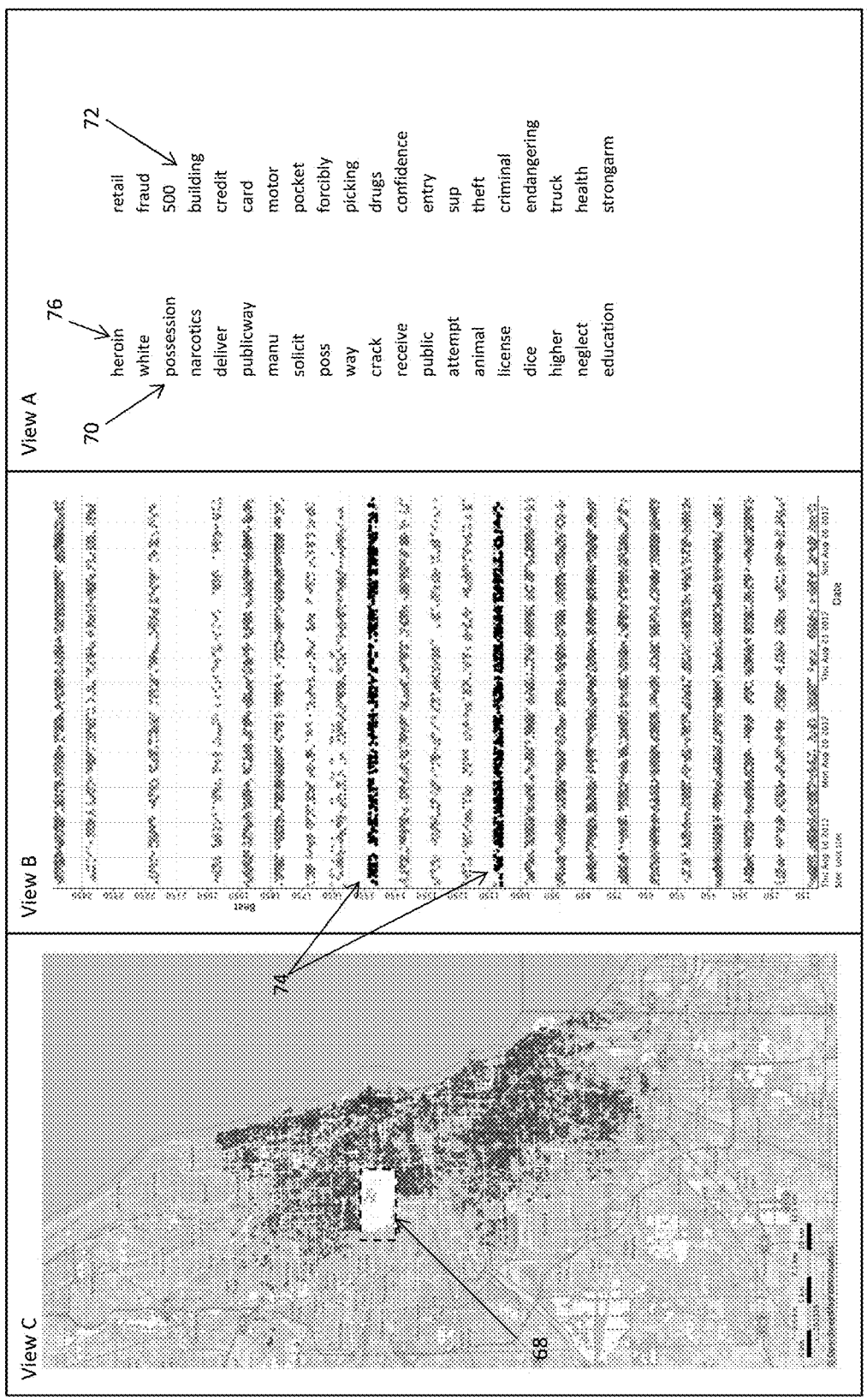
FIG. 7 is a schematic representation of a user interface in accordance with an embodiment of the invention.

In the initial state shown in FIG. 6 a user query 200 may be performed on the database. Thereto a user selects an item of data by means of an input unit 28. The item of data may be selected 204 from the first view A, the second view B or the third view C. FIG. 7 shows an example of performing a query by selecting an item of data from view C. In the example the selection concerns a geographical area indicated at 68. The geographical area is selected by selecting an area in the representation of the map. The area can e.g. be selected by drawing a contour, such as a rectangle, e.g. by using the mouse.

In response to receipt of the user selection, the data processing system 6 processes 206 the user selection. Thereto, the data processing system determines the items of data associated with the user selection. In this example, the data processing system 6 determines the geographical indicators associated with the police reports having a geographical indicator that falls within the selected area. This selection of items of data forms the user query to be performed on the records 4 in the database 2.

For performing the user query, the data processing system 6 assigns 302 each record 4 of the database 2 to a first group of records or to a second group of records. Here the first group constitutes an in-group, i.e. the records that comprise the selected items(s) of data, i.e. the geographical indicator corresponding to the selected area. Here the second group constitutes an out-group, i.e. the records that do not comprise the selected items(s) of data, i.e. the geographical indicator corresponding to the selected area. Hence, in this example the records of the database are divided into an in-group and an out-group.

FIG. 7 shows in the first view A a first list 70 of items of data representative of the first plurality of items of data. FIG. 7 shows in the first view A a second list 72 of items of data representative of the second plurality of items of data. The first and second lists are ordered lists in this example.

Simultaneously, the second view B is updated. The selected items of data determine all records associated with the police reports having a geographical indicator that falls within the selected area. The graphical representation of these police reports as black dots at 74 in the second view B of FIG. 7. In this example the numerical indexes of the records associated with the selected geographical area are mainly in the range of 1100-1150 and 1500-1550. These numerical indexes correspond to police routes within the selected geographical area.

Figure 8:
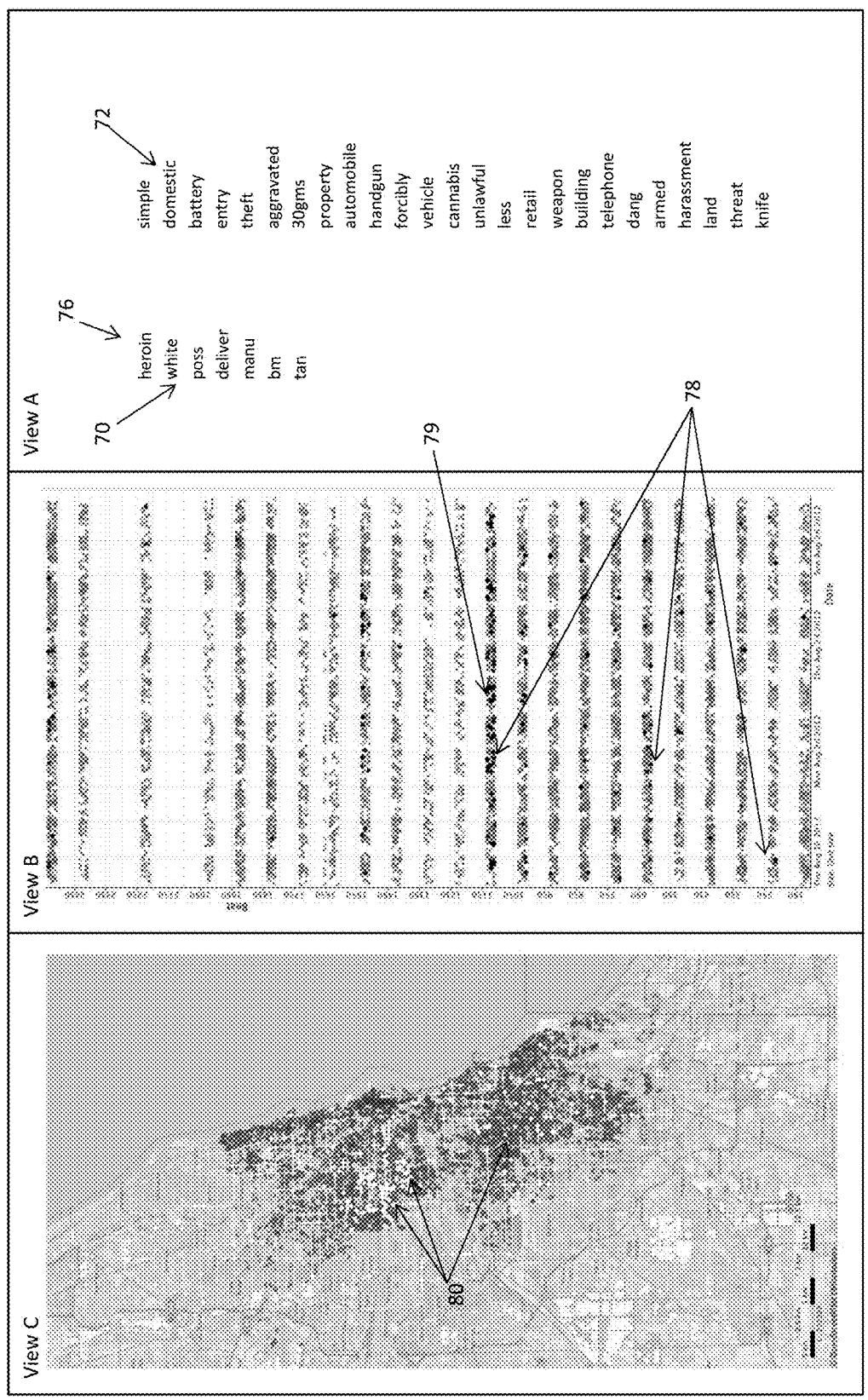
FIG. 8 is a schematic representation of a user interface in accordance with an embodiment of the invention.

It is also possible to select an item of data in the first view A. FIG. 8 shows an example of a user interface when in the first view A of FIG. 6 or FIG. 7 the item of data "heroin" is selected at 76 from the first list 70. Similarly as described above, the data processing system 6 assigns 302 each record 4 to a first group of records or to a second group of records. Here the first group constitutes the in-group, i.e. the group of records including the word "heroin". Here the second group constitutes the out-group, i.e. the group of records not including the word "heroin". With the records re-assigned to the first and second groups, the discriminative power for each item of data can be determined. FIG. 8 shows in the first view A the first list 70 of words according to the redetermined first plurality of items of data. FIG. 8 shows in the first view A the second list 72 of words according to the redetermined second plurality of items of data. In this example the first list 70 contains fewer items of data than the second list.

Simultaneously, the second view B is updated. The selected item of data "heroin" is used to determine all records including the word "heroin". The records associated with the police reports including the word "heroin" are indicated as black dots at 78 in the second view B of FIG. 8. It will be appreciated that in this example the records including the item of data "heroin" are spread out over many numerical indexes and spread out in time. However, it is for instance possible to see temporal effects in the occurrence of the word "heroin" in the records. At 79 for example a temporal increase of the occurrence of the word "heroin" in the records can be observed.

Simultaneously, the third view C is updated. The selected item of data "heroin" is used to determine all records including the word "heroin". The records associated with the police reports including the word "heroin" are indicated as white dots at 80 in the third view C of FIG. 8. It will be appreciated that in this example the records including the item of data "heroin" are spread out over a large geographical range.

Figure 9:
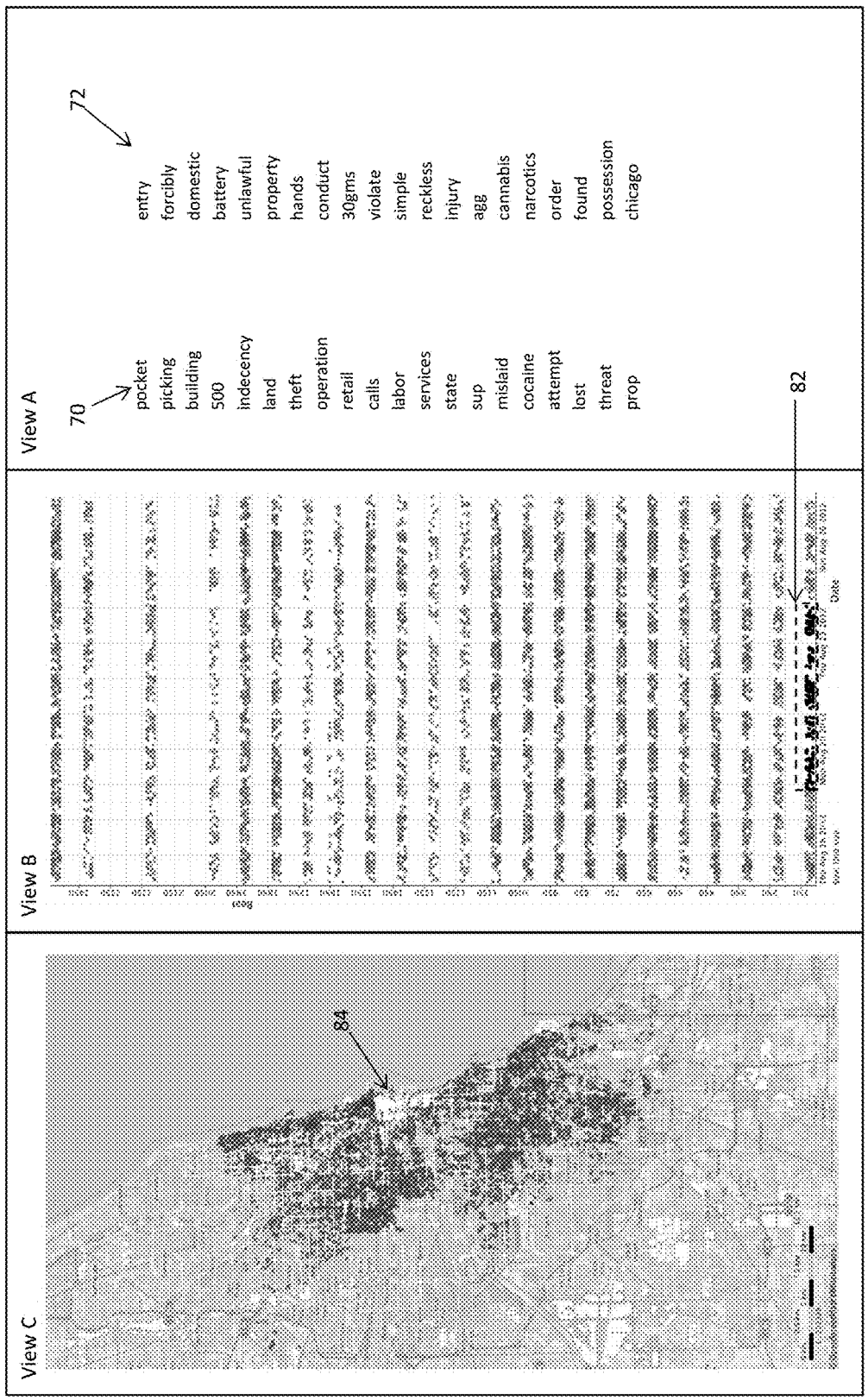
FIG. 9 is a schematic representation of a user interface in accordance with an embodiment of the invention.

It is also possible to select an item of data in the second view B. FIG. 9 shows an example of a user interface when in the second view B of FIG. 6, FIG. 7, or FIG. 8 a range 82 of numerical indexes in the range of 100-150 in a certain time period is selected. In response to receipt of the user selection, the data processing system 6 processes 206 the user selection. Thereto, the data processing system determines the items of data associated with the user selection. In this example, the data processing system 6 determines the numerical indexes and time stamps associated with the police reports within the selection. This selection of items of data forms the user query to be performed on the records 4 in the database 2.

For performing the user query, the data processing system 6 assigns 302 each record 4 of the database 2 to a first group of records or to a second group of records. Here the first group constitutes an in-group, i.e. the records that comprise a numerical index and time stamp associated with the police reports within the selection. Here the second group constitutes an out-group, i.e. the records that do not comprise the selected items(s) of data, i.e. do not comprise both a numerical index and time stamp associated with the police reports within the selection.

FIG. 9 shows in the first view A a first list 70 of items of data representative of the first plurality of items of data. FIG. 9 shows in the first view A a second list 72 of items of data representative of the second plurality of items of data. The first and second lists are ordered lists in this example.

Simultaneously, the third view C is updated. The selected items of data, i.e. the numerical indexes and time stamps within the selection are used to determine all records including a numerical index and time stamp within the selection. These records are indicated as white dots at 84 in the third view C of FIG. 9. It will be appreciated that in this example the records including a numerical index and time stamp within the selection are concentrated in downtown Chicago.

It will be appreciated that in the example of FIGS. 6-9 the multiple views, and the possibility to select items of data for querying the database provides highly useful possibilities for interactively querying the database. It is for example possible to select a word, such as "heroin" as shown above and immediately see the geographical areas that have an occurrence of said word, and simultaneously see the temporal changes in the occurrence of the word in the records. From this the user can continue by selecting the geographical area just indicated as relevant in view of "heroin" occurring in the records, and see in the first view words related to this geographical area. This may initiate a query based on another word than "heroin". Alternatively, the user could continue by selecting a time slot indicated as relevant in view of "heroin" occurring in the records, and see in the first view words related to this time slot. This may initiate a query based on yet another word than "heroin". Also, the first view provides insight in other words that have a high discriminative power for records including the word "heroin", which can be selected for further querying. Further, the first view provides insight in other words that have a high discriminative power for records not including the word "heroin". These too may be used as user selection for further querying.

Figure 10:
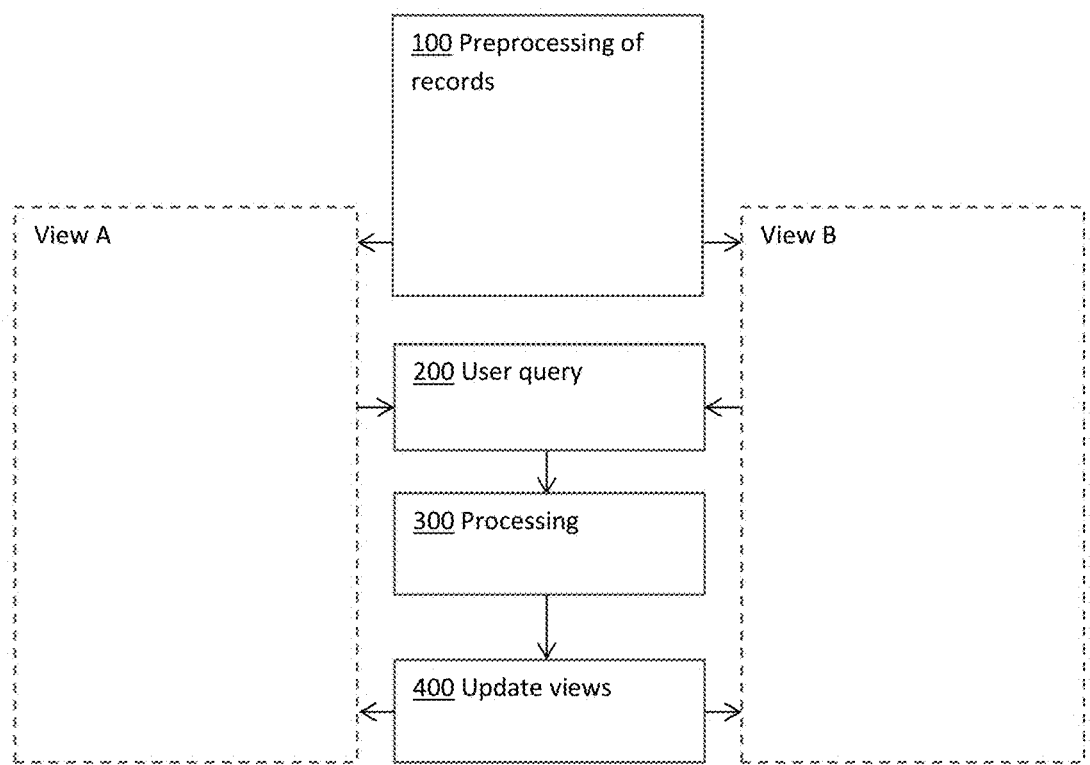
FIG. 10 is a schematic flow chart of a method in accordance with an embodiment of the invention.

FIG. 10 shows a schematic flow chart of a method in accordance with an embodiment of the invention. In step 100 the records of the database are preprocessed, so as to yield the concordance and/or the list of representations. The results of preprocessing are presented to the user, e.g. in the first view A and the second view B as described above. Next, a user query is performed in step 200. In response to the user query a processing step 300 is performed, yielding the first plurality of items of data and the second plurality of items of data. In step 400 the views are updated in accordance with the processing and the (re)determined first and second plurality of items of data.

Figure 11:
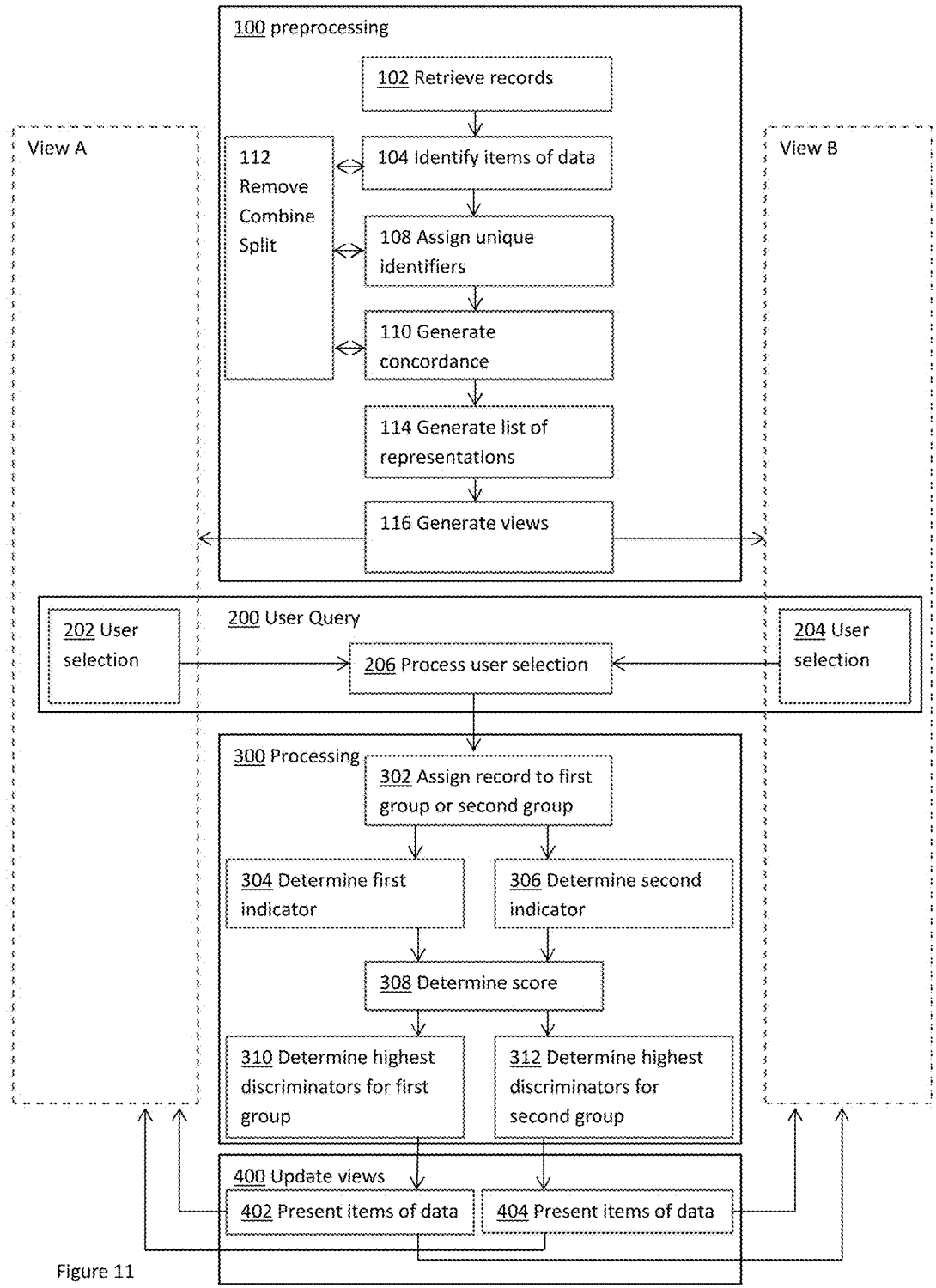
FIG. 11 is a schematic flow chart of a method in accordance with an embodiment of the invention.
Figure 12:
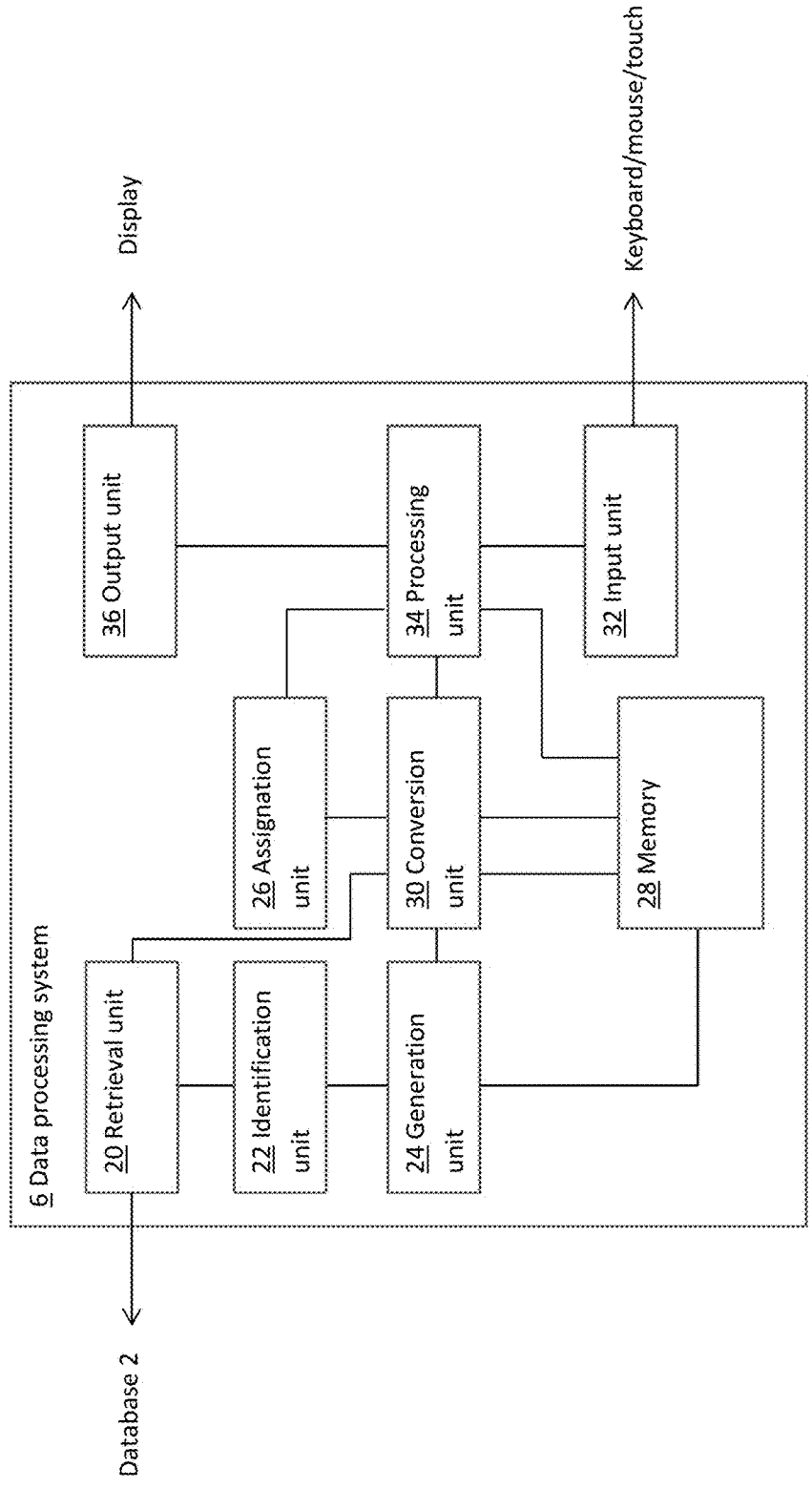
FIG. 12 is a schematic block diagram of a data processing system in accordance with an embodiment of the invention.

An embodiment of a possible implementation of the invention will now be explained in more detail in relation to FIG. 11 and FIG. 12. FIG. 12 shows an example of a schematic representation of a data processing system 6 according to the invention. The data processing system 6 is associated with a database 2 storing a set of records. The processing system 6 includes a retrieval unit 20 arranged for retrieving records from the database 2. As will be explained below, the data processing system 6 further includes an identification unit 22 arranged for identifying in each record one or more items of data. A generation unit 24 is arranged for generating a concordance of the items of data identified in the records. The data processing system further includes an assignation unit 26 arranged for assigning each record to a first group of records or to a second group of records. A conversion unit 30 may be included for generating a list of representations, each representation representing a record in the database 2. The data processing system further includes a processing unit 34 arranged for determining for each item of data a first indicator representative of its occurrences in the records of the first group, determining for each item of data a second indicator representative of its occurrences in the records of the second group; and determining for each item of data a score representative of a discriminative power of that item of data on the basis of the first and second indicator of that item of data. The data processing system 6 includes, or is associated with, a memory 28 for storing the concordance and/or the list of representations. The data processing unit further includes an input unit 32 for receiving a user input and an output unit 36 for outputting information towards the user.

In this embodiment, the method starts by preprocessing 100 the records 4 contained in the database 2. Thereto, a retrieval unit 20 of the data processing system 6 retrieves 102 all records from the database. In the example mentioned in relation to FIG. 10, the retrieval unit 20 retrieves all email messages from the database 2. FIG. 13A shows a simplified example for four records, each containing a text of a few words. An identification unit 22 identifies 104 items of data included within the records 4. In the example of FIG. 5A the identification unit 22 identifies all unique words within the text data of the records. In this example, the identification unit 22 further assigns 108 an identifier to each unique identified item of data. A generation unit 24 then generates a concordance of all unique items of data. The concordance for the simplified example of FIG. 13A is shown in FIG. 13B. The concordance can include the identifiers. In this example, the preprocessing 100 also includes generating 114, by a generation unit 24, a list of representations. Each representation represents a record of the database and includes the unique items of data, and/or the corresponding identifiers, occurring in that record. FIG. 13C shows the representations of the records of the simplified example of FIG. 13A. In an embodiment, the representation may also include data representative of a prevalence of each occurring item of data within the record.

It will be appreciated that in practice the concordance can be modified for optimizing the concordance for the purpose of browsing the records 4. The concordance may be optimized such that the included items of data represent relevant query items.

Thereto, in step 112, certain items of data may be removed from the concordance. It will be appreciated that for example stop words can be omitted from the concordance. Stop words are words which do not contain important significance to be used in search queries. Common stop words that can be eliminated are "a", "the", "is", "was", "on", "which", etc. It will be appreciated that such stop words are generally known to the person skilled in the art and lists of stop words are readily available. It will also be appreciated that a list of applicable stop words may be dependent on the content of the database.

Also, in step 112 certain items of data can be combined. It will be appreciated that words may be combined, e.g. by stemming or conversion to lower case. Stemming is a process for reducing inflected (or sometimes derived) words to their stem, base or root form. Stemming algorithms are known per se and readily available in the art. Alternatively, or additionally, combining of items of data may be performed by the user, e.g. in a teach mode. Thereto a functionality can be provided in which the user can indicate that certain items of data are to be combined. The functionality can then e.g. assign the same unique identifier to those items of data.

Also, in step 112 certain items of data may be split. It will be appreciated that words may be split, e.g. by disambiguation. Word-sense disambiguation (WSD) is a process of identifying which sense of a word (i.e. meaning) is used in a sentence, when the word has multiple meanings. For instance the word "bank" can refer to an establishment for monetary transactions as well as to a rising ground bordering a river, depending on the context. The concordance may include a unique entry for each meaning of a word. It will be appreciated that when determining to which meaning an occurrence of such word in a record relates, the context of said word (e.g. words in close proximity to said word) can be taken into account. Splitting of items of data may be performed by the user, e.g. in a teach mode. Thereto a functionality can be provided in which the user can indicate that certain items of data are to be split.

The removing, combining and/or splitting may be executed upon identification of the items of data, upon assigning the identifiers, and/or upon generating the concordance. The concordance can be stored in a memory 28 associated with the data processing unit 4, so that the concordance need not be updated or determined again unless the content of the database changes.

Further, in preprocessing 100 a conversion unit 30 of the data processing system 6 converts the records to a list of representations. For each record an associated representation is generated 114. It will be appreciated that the conversion unit 30 may remove duplicates of records. Each representation is a list of items of data, or the associated unique identifiers, that occur in the respective record. If desired the representations may include information on a prevalence of the respective items of data in the respective record. FIG. 13C shows an example of a list of representations for the records of the simplified example of FIG. 13A. The representations can be stored in the memory 28 so that the representations need not be updated or determined again unless the content of the database changes. It will be appreciated that the representations form a much smaller amount of data to be stored than the associated records. The list of representations can be a table, of e.g. integer values, with in rows the individual records and in columns the unique items of data in the concordance (or vice versa).

Thus the preprocessing 100 of the records yields the concordance and the list of representations. The result of preprocessing can be used for generating 116 data representing a user interface representative of the concordance. The data processing system 6 can determine a frequency of occurrence in the combined records of the items of data included in the concordance. Such frequency of occurrence can relate to the total number of occurrences of each item of data. Such frequency of occurrence can also relate to the number of records in which each item of data occurs at least once as in the example of FIG. 13E.

FIG. 2 shows a schematic representation of a generated 116 user interface in relation to preprocessing 100. Next, a user query 200 may be performed on the database. Thereto a user selects an item of data by means of an input unit 28. The input unit may be a keyboard, mouse, touchpad, touch functionality of a touch screen, microphone, camera or the like. The item of data may be selected 204 from the first view A or may be selected 202 from the second view B. FIG. 2 shows an example of performing a query by selecting 202 an item of data from view B.

In response to receipt of the user selection, the data processing system 6 processes 206 the user selection. Thereto, the data processing system determines the item of data or items of data associated with the user selection. In the example of FIG. 2, the data processing system 6 determines the name associated with the sender of the selected stream of email messages. This selection of items of data forms the user query to be performed on the records 4 in the database 2.

For performing the user query, the data processing system 6 starts processing step 300. An assignation unit 26 assigns 302 each record 4 to a first group of records or to a second group of records. Here the first group constitutes an in-group, i.e. a group of records that complies with the user query. Here the in-group contains the records that comprise the selected items(s) of data, i.e. the name of the sender. It will be appreciated that it is not necessary that all records indicate the selected item of data as the sender of that particular email message. Also records containing the selected item of data as recipient, or as part of the content of the email message, will form part of the in-group. Here the second group constitutes an out-group, i.e. a group of records that does not comply with the user query. Here the out-group contains the records that do not comprise the selected items(s) of data. FIG. 13D shows how the records of the simplified example of FIG. 13A are assigned to an in-group and an out-group in response to a fictional query relating to the word "this".

Next, a processing unit 34 of the data processing system 6 determines 304, 306 for each item of data a first indicator and a second indicator. The first indicator is representative of the occurrences of the respective item of data in the records of the first group. In an embodiment the processing unit takes the representations of the records in the first group and for each item of data sums the occurrences of that item of data, or the unique identifier thereof, in the representations of the records in the first group. This sum then can be the first indicator. If the representations include a prevalence, this prevalence can be taken into account when determining the first indicator. The second indicator is representative of the occurrences of the respective item of data in the records of the second group. In an embodiment the processing unit takes the representations of the records in the second group and for each item of data sums the occurrences of that item of data, or the unique identifier thereof, in the representations of the records in the second group. This sum then can be the second indicator. If the representations include a prevalence, this prevalence can be taken into account when determining the second indicator. FIG. 13E shows the determination of the first indicator $I_1$ and the second indicator $I_2$ for each item of data by summing the occurrences ("0" or "1") of that item of data for records 2 and 3 (first group/in-group) and for records 1 and 2 (second group/out-group) in the list of representations respectively. As the processing unit can take the representations of the records and for each item of data sums the occurrences of that item of data, or the unique identifier thereof, in the first and second group of records, the processing for determining the first and second indicator can be (NR−2) simple additions of e.g. integer values, with NR being the number of records in the database. For the entire database only NI sets of first and second indicators need to be determined, with NI being the number of items of data in the concordance. Therefore, the amount of processing for the entire database is extremely limited, the bulk of heavy calculation being done in preprocessing. This makes the process highly suitable for handling big data.

With the first indicator and the second indicator, the processing unit 34 can determine 308 for each item of data a score S representative of a discriminative power of that item of data. The score S can be representative of the discriminative power of the item of data for the first or second group of records. A high discriminative power for records of the first group indicates an item of data having a high likelihood of occurring in a record of the first group and a low likelihood of occurring in a record of the second group. A high discriminative power for records of the second group indicates an item of data having a high likelihood of occurring in a record of the second group and a low likelihood of occurring in a record of the first group. The score S can in addition also be representative of a prevalence of the item of data in the first group or in the second group. It will be appreciated that an item of data that occurs very few times in the records, may have a high likelihood of occurring more often in one of the two groups, but due to its low prevalence still can have a low discriminative power with respect to that group as a whole. Therefore, in an embodiment the score S takes prevalence into account as well. In an embodiment the highest scores are associated with items of data that have the highest discriminative power for records of the first group and the lowest (or largest negative) scores are associated with items of data that have the highest discriminative power for records of the second group. In the example of FIG. 13E the scores are calculated using the formula $S=(I_1^{1.5}-I_2^{1.5})/(I_1+I_2)$. This formula yields an increased positive or negative score for items of data having both a higher likelihood of occurring in one of the two groups and having a higher prevalence. More in general, other formulae can be used as well. The score S can e.g. be calculated as $S=(I_1^N-I_2^N)/(I_1+I_2)^M$, wherein $I_1$ is the first score, $I_2$ is the second score, N is a parameter between ⅓ and 3 and M is a parameter between ⅓ and 3. Optionally, N is between 1 and 2. Optionally M is between 0.5 and 1. The score can also be calculated as $S=(I_1^N-I_2^N)/(I_1^M+I_2^M)$, $S=(I_1-I_2)^N/(I_1+I_2)^M$, or $S=(I_1-I_2)^N/(I_1+I_2)^M$. The best formula for calculating the score S can depend on the nature of the data stored in the database.

When the scores for all items of data have been determined, the processing unit 34 determines 310 a first plurality (e.g. a predetermined number) items of data having the highest discriminative power for records of the first group and determines 312 a second plurality (e.g. a predetermined number) of items of data having the highest discriminative power for records of the second group. In the present example the first plurality of items of data includes the items of data having the highest scores. In the present example the second plurality of items of data includes the items of data having the lowest (most negative) scores. The processing unit 34 may sort the items of data according to their scores for this.

Thus the processing 300 yields the first and second plurality of items of data. The result of processing can be used for generating data representing a user interface representative of the first and second plurality of items of data. This can be done in step 400 for updating all views, e.g. the views A and B of FIG. 2. In FIG. 3 the updated views are shown. It will be appreciated that the selected item of data (e.g. selected at 44 in view B of FIG. 3) is also among the first plurality of items of data as indicated at 46, viz. the word (name) "dasovich". It will be appreciated that the word cloud 40 can be constructed to provide an indication of the score. For example a font size of the items of data (words) in the word clouds can be scaled according to the absolute value of the score S associated with the respective item of data. It is also possible the word cloud 40 can be constructed to provide an indication of an average distance between two items of data of one group within the texts of the records of that group.

FIG. 3 showed a user selection in the second view B resulting in a word cloud 40 containing items of data from the in-group as well as items of data from the out-group. It is noted that due to the use of the concordance and list of representations the inventors have succeeded in providing real-time updating of the first view A in response to a user selection in the second view B.

It is also possible to select an item of data in the first view A. FIG. 4 shows an example of a user interface when in the first view A of FIG. 3 the item of data "california" is selected at 52. Similarly as described above, the assignation unit 26 assigns 302 each record 4 to a first group of records or to a second group of records. Here the first group constitutes the in-group, i.e. the group of records including the word "california". Here the second group constitutes the out-group, i.e. the group of records not including the word "california". With the records re-assigned to the first and second groups, the first indicator $I_1$, the second indicator $I_2$, and the score S for each item of data can be determined. It will be appreciated that the concordance and the list of representations need not be determined anew, saving valuable processing time. With the recalculated scores for each item of data, the first plurality of items of data and the second plurality of items of data can be determined anew. FIG. 4 shows in the first view A a word cloud including these redetermined first and second pluralities of items of data. Simultaneously, the second view B is updated. The selected item of data "california" is used to determine all email messages including the word "california". The graphical representation of these email messages is shown in black at 56 in the second view B of FIG. 8 in accordance with US2014/0132623, incorporated herein by reference.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the above example, the records included text. It will be appreciated that the records can also include images, such as moving images, and/or audio data. In case the records include images, the first list of items of data and the second list of items of data can include images, such as moving images. The images can be selected as in-group or out-group, e.g. on the basis of a description of the image in text, and/or on the basis of image attributes, such as color, subject (portrait, landscape, car, etc.), contrast, etc. Of course, these records can also contain time stamps, geospatial information, information on interrelation between records, etc. that can be used for querying the records, e.g. for selecting images as in-group or out-group. In case records relate to audio data, the records can include transcripts, e.g. automatically generated transcripts, of audio data.

In the above examples, stop words are removed from the concordance. Since stop words have a high chance of occurring in many records, stop words are likely to have a very low discriminative power for records. Stop words have a large likelihood of equally occurring in records of the first group and records of the second group. Therefore, as will be appreciated, it is not always necessary to remove stop words. The need to remove stop words may depend on the nature of the data in the database. It will be appreciated that in the above examples the removal of stop words is not necessary.

In the above examples, the combining of words was presented on the basis of linguistics. It will be appreciated that it is also possible to combine items of data on the basis of the function of the items of data. For instance, it is possible that the concordance has one combined entry "name" for all instances of personal names, e.g. so as to anonymize the processing. It is also possible that the concordance has one or more combined entries for scalar items of data. The concordance could for instance include two entries "high temperature" and "low temperature" and assign "high temperature" to records including an item of data representative of a temperature above a predetermined threshold, and assign "low temperature" to records including an item of data representative of a temperature below said predetermined threshold. Also for this purpose a functionality can be provided in which the user can indicate that certain items of data, or certain types of items of data, are to be combined.

In the above example, the records are assigned to a first group of records or to a second group of records. It will be appreciated that the records can also be assigned to a first group of records, a second group of records, or to one or more further groups of records. For example, in the example of FIG. 7, the records comprising the selected geographical indicator could be divided into an in-group, the records comprising a geographical indicator different from the selected geographical indicator could be divided into an out-group, and the records not comprising a geographical indicator could be divided into a rest-group.

It is also possible that the user query is performed as a multi-step process. In a first step a preselection could be performed, e.g. selecting only those records that have a geographical indicator relating to Chicago or New York. This preselection would yield a sub-set of the data set included in the database. Next, on this sub-set in a second step a query is performed. This second step could e.g. comprise selecting the word "Chicago". Then an in-group (within the sub-set) would include all records including the word "Chicago" and an out-group (within the sub-set) would include all records including the word "New York". Hence, in the first step a sub-set of the database is selected, and in the second step a selection within the sub set is made. This can provide increased possibilities for uncovering information on differences between the two groups ("Chicago" and "New York") that are effectively compared in the second step. It will be appreciated that it is also possible to add further preselection steps for limiting the sub-set of the database that the query is performed on. In the above examples, the records relate to emails and police reports. However, the applicability of the present invention is much wider. In a similar way as described above, the invention can be used for querying other databases including records containing items of information. By way of non-exhaustive list some more exemplary embodiments are given below.

As a third example the records in the database relate to litigation documents. The litigation documents may include email messages, memos, instructions, specification sheets, letters, faxes, reports, etc. These litigation documents can contain text, time stamps, geospatial information, information on interrelation between records, etc. The database of litigation documents relating to a single court case can contain hundreds of thousands records. In order to uncover information from such vast amount of records of diverse nature, querying the database according to the invention can be used. Hence the user can select items of data for querying in words, time slots, geographical areas, etc. The concept of using the in-group and out-group can also be used for efficiently unearthing both incriminating and discharging information. When the in-group relates to incriminating items of data, there is a high likelihood that the out-group relates to discharging items of data (and vice versa).

As a fourth example, the invention is put to use for sales force management. The records in the database can relate to contact relationship management records, such as contact details, client contact reports, sales reports, commercial reports, payment behavior, quotations, distributor networks, commercial agreements, discount agreements, etc. These records can contain text, time stamps, geospatial information, information on interrelation between records, etc. The invention can be put to use to query the contact relationship management records. Specific knowledge, commonly residing by sales managers, may not be necessary to query the database. The concept of using the in-group and out-group can also be used for efficiently discriminating between contacts certain agreements or rights and contacts not having such agreements or rights.

As a fifth example, the records in the database relate to investment data. The investment data may include stock exchange information, share values, accounting information, currency information, fund information, company information, market information, etc. These records can contain text, time stamps, geospatial information, information on interrelation between records, etc. The invention can be put to use to query the investment data. The intuitive querying can uncover relationships between data that is not obvious at first sight. The concept of using the in-group and out-group can also be used for discriminating between positive and negative influences on investment decisions.

As a sixth example, the records in the database relate to social media data. The records can include entries on facebook, tweets, SMS-messages, etc. These records can contain text, time stamps, geospatial information, information on interrelation between records, etc. From the social media data for instance trends or hot topics can be determined. It can also be determined where trends occur, how trends spread or move. The concept of using the in-group and out-group can also be used for identifying trends and counter-trends.

As a seventh example, the records in the database relate to technical visit reports. The technical visit reports data may include drawings, models, specification sheets, parts lists, version information, fault reports, photographs, etc. These records can contain text, time stamps, geospatial information, information on interrelation between records, etc. The invention can be put to use to query disparate documents.

As an eighth example, the records in the database relate to clinical and/or pharmaceutical data. The clinical and/or pharmaceutical data may include medical records, reports, clinical trial data, chemical formula fragments, chemical formulae, biological formulae fragments, biological formulae, mathematical formula fragments, mathematical formulae, etc. These records can contain text, time stamps, geospatial information, information on interrelation between records, etc. When the medical records include patient identifiers, it is possible to combine patient identifiers as a single entry in the concordance. This obscures the patient identifiers in the query results, increasing privacy. The concept of using the in-group and out-group can e.g. be used for uncovering data related to effects of drugs in view of test groups and control groups.

As a ninth example, the records in the database relate to forensic and/or law enforcement. The forensic and/or law enforcement data may include drawings, models, photographs, reports, email messages, telephone calls, etc. These records can contain text, time stamps, geospatial information, information on interrelation between records, etc. The invention can be put to use to query disparate documents.

As a tenth example, the records in the database relate to technical documentation data. The technical documentation data may include drawings, models, specification sheets, instruction manuals, parts lists, version information, reports, etc. These records can contain text, time stamps, geospatial information, information on interrelation between records, etc. The invention can be put to use to query disparate documents.

As an eleventh example, the records in the database relate to patent information. The records can include patent descriptions, bibliographic data, applicant data, prior art citations, etc. These records can contain text, time stamps, geospatial information, information on interrelation between records, etc. The concept of using the in-group and out-group can e.g. be used for uncovering data related to technological fields in which companies are and are not active.

As a twelfth example, the records in the database relate to telephone calls. The records can include voice recordings of telephone calls. The records can also include transcripts, e.g. automatically generated transcripts, of telephone calls. These records can contain text, time stamps, geospatial information, information on interrelation between records, etc.

As a thirteenth example, the records in the database relate to mixed data. Such mixed data can e.g. be all data included on a company server or company network, all data included on a personal hard disk or home network, data included on a public network, such as (part of) the internet. These records can contain text, time stamps, geospatial information, information on interrelation between records, etc. The invention can be put to use for querying such mixed data. The concept of using the in-group and out-group can e.g. be used for interactive browsing the data. The concept of using the in-group and out-group can also be used for focusing a query when the desired outcome of the query is not (completely) clear at the onset of a querying session.

As a fourteenth example, the records in the database relate to images, such as moving images. The database can e.g. include records relating to a plurality of movies, tv-series episodes or the like. It will be appreciated that such records can include still images, moving images, text descriptives etc. Of course, these records can also contain time stamps, geospatial information, information on interrelation between records, etc. that can be used for querying the records, e.g. for selecting movies as in-group or out-group with respect to user preferences.

It will be appreciated that the retrieval unit, the identification unit, the generation unit, the assignation unit, the conversion unit, the output unit, the processing unit, and the input unit can be embodied as dedicated electronic circuits, possibly including software code portions. The retrieval unit, the identification unit, the generation unit, the assignation unit, the conversion unit, the output unit, the processing unit, and the input unit can also be embodied as software code portions executed on, and e.g. stored in, a memory of, a programmable apparatus such as a computer.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means, e.g. via the internet or cloud.

When a program is embodied in a signal which may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant processes.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A non-transitory computer readable medium storing instructions for causing an electronic processor to access a data set that includes a plurality of records, wherein each record is associated with at least one item of data, the instructions causing the processor in real-time to perform the following steps:
    preprocess, where a conversion unit converts the plurality of records into a list of representations and concordance;
    receive a data query on the data set;
    assign each record that complies with the query to an in-group using an assignation unit;
    assign each record that does not comply with the query to an out-group using the assignation unit;
    determine, for each of said at least one item of data, a first indicator and a second indicator, wherein, for the entire data set, only NI sets of the first indicator and the second indicator are determined, where NI is a number of items of the data in the concordance;
    determine, for each of said at least one item of data a score S representative of a discriminative power of the at least one tern of data, wherein the score is calculated using a formula $S=(I_1^{1.5}-I_2^{1.5})/(I_1+I_2)$; wherein $I_1$ is the first score and $I_2$ is the second score;
    determine a first plurality of words appearing in records of the in-group;
    determine a second plurality of words appearing in records of the out-group; and
    generate a displayable user interface, which includes a dual word cloud, representative of the first plurality of words and the second plurality of words such that each of the first plurality of words share a common trait so as to be distinguishable from each of the second plurality of words, wherein:
    the user interface includes a first view comprising data representative of the in-group and the out-group, and the user interface includes at least one further view including data representative of data representative of the records in different formats,
    the dual word cloud includes the first plurality of words relating to the in-group of records that comply with a particular query. the dual word cloud includes the second plurality of words relating to the out-group of records that do not comply with the query, and the dual word cloud includes both words having high discriminative powers for the records of the in-group and the out-group, and
    all views are updated upon user selection of at least one item of data in one of the views.

2. The non-transitory computer readable medium of claim 1, wherein the at least one further view comprises data representative of geographical information relating to the records, temporal information relating to the records, or relational information relating to the records.

3. The non-transitory computer readable medium of claim 1, wherein the first view and the at least one further view are coupled.

4. The non-transitory computer readable medium of claim 1, wherein the data query on the data set includes selection of one or more data items in the first view or one of the at least one further views.

5. The non-transitory computer readable medium of claim 4, wherein all views are updated instantaneously.

6. The non-transitory computer readable medium of claim 1, the instructions causing the processor to:
    determine a first plurality of words having a high discriminative power favoring records of the in-group and generate a user interface representative of said words; and
    determine a second plurality of words having a high discriminative power favoring records of the out-group and generate a user interface representative of said words.

7. A non-transitory computer readable medium storing instructions for causing an electronic processor to access a data set that include a plurality of records, wherein each record is associated with at least one item of data, the instructions causing the processor in real-time to perform the following operations:
    preprocess, where a conversion unit converts the plurality of records into a list of representations and concordance;
    receive a data query on the data set;
    assign each record that complies with the query to a first group using an assignation unit;
    assign each record that does not comply with the query to a second group using the assignation unit;
    determine, for each of that at least one item of data, a first indicator and a second indicator, wherein, for the entire data set, only NI sets of the first indicator and the second indicator are determined, where NI is a number of iters of the data in the concordance;

determine, for each of the at least one term of data, a score S representative of a discriminative power of that said at least one item of data, wherein the score is calculated using a formula $S+(I_1^{1.5}-I_2^{1.5})/(I_1+I_2)$; wherein $I_1$ is the first score and $I_2$ is the second score;

determine a first plurality of items of data appearing in records of the first group;

determine a second plurality of items of data appearing in records of the second group; and generate a displayable user interface representative of the first plurality of items and the second plurality of items such that each of the first plurality of items share a common trait so as to be distinguishable from each of the second plurality of items, wherein:

the user interface includes a first view including data representative of the first group and the second group, and the user interface includes at least one further view comprising data representative of data representative of the records in different formats, the dual word cloud includes the first plurality of words relating to the first group of records that comply with a particular query, the dual word cloud includes the second plurality of words relating to the second group of records that do not comply with the query, and the dual word cloud includes both words having high discriminative powers for the records of the first group and the second group, and all views are updated upon user selection of at least one item of data in one of the views.

8. The non-transitory computer readable medium of claim 7, wherein the items of data are one or more of words, groups of words, texts, image fragments, images, video fragments, audio fragments, numbers, chemical formula fragments, chemical formulae, mathematical formula fragments, mathematical formulae.

9. A non-transitory computer readable medium storing instructions for causing an electronic processor to generate a user interface including data representative of a reference item of data included in a record in a data set comprising a plurality of records, the instructions causing the processor in real-time to perform the following operations:

preprocess, where a conversion unit converts the plurality of records into a list of representations and concordance;

determine, for each of said at least one item of data, a first indicator and a second indicator, wherein, for the entire data set, only NI sets of the first indicator and the second indicator are determined, where NI is a number of items of the data in the concordance;

determine, for each of the at least one item of data, a score S representative of a discriminative power of that said at least one item, of data, wherein the score is calculated using a formula $S=(I_1^{1.5}-I_2^{1.5})/(I_1+I_2)$; wherein $I_1$ is the first score and $I_2$ is the second score:

determine a first plurality of items of data appearing in records including the reference item;

determine a second plurality of items of data appearing in records not including the reference item; and generate a displayable user interface representative of the first plurality of items and the second plurality of items such that each of the first plurality of items share a common trait so as to be distinguishable from each of the second plurality of items, wherein:

the user interface includes a first view comprising data representative of an in-group and an out-group, and the user interface includes at least one further view comprising data representative of data representative of the records in different formats, the dual word cloud includes the first plurality of words relating to the in-group of records that comply with a particular query, the dual word cloud includes the second plurality of words relating to the out-group of records that do not comply with the query, and the dual word cloud includes both words having high discriminative powers for the records of the in-group and the out-group, and all views are updated upon user selection of at least one item of data in one of the views.

10. A data processing system for accessing a data set including a plurality of records, wherein each record is associated with at least one item of data, the system comprising:

a conversion unit for preprocessing a conversion of the plurality of records into a list of representations and concordance;

an input unit for receiving a data query on the data set; a an assignation unit for assigning each record to one of a first group and to a second group with respect to the query; and a processing unit for determining, for each of said at least one item of data, a first indicator and a second indicator, wherein:

for the entire data set, only NI sets of the first indicator and the second indicator are determined where the NI is a number of items of the data in the concordance;

the processing unit determines, for each of said at least one item of data, a score S representative of a discriminative power of the at least one item of data;

the score is calculated using a formula $S=(I_1^{1.5}-I_2^{1.5})/(I_1+I_2)$; wherein $I_1$ is the first score and $I_2$ is the second score;

the processing unit is arranged for determining a first plurality of items of data appearing in records of the first group and a second plurality of items of data appearing in records of the second group, and generating a displayable user interface representative of the first plurality of items and the second plurality of items such that each of the first plurality of items share a common trait so as to be distinguishable from each of the second plurality of items, the user interface includes a first view including data representative of the first group and the second group, and the user interface includes at least one further view comprising data representative of data representative of the records in different formats, the dual word cloud includes the first plurality of words relating to the first group of records that comply with a particular query, the dual word cloud includes the second plurality of words relating to the second group of records that do not comply with the query, and the dual word cloud includes both words having high discriminative powers for the records of the first group and the second group, and all views are updated upon user selection of at least one item of data in one of the views.

11. A non-transitory computer readable medium storing computer implementable instructions, which when implemented by a programmable computer, cause the computer in real-time to perform the following operations;

preprocess, where a conversion unit converts the plurality of records into a list of representations and concordance;

receive a data query on the data set;

assign each record to one of a first group and to a second group;

determine for each of said at least one item of data a first indicator and a second indicator, wherein, for the entire data set, only NI sets of the first indicator and the second indicator are determined, where NI is a number of items of the data in the concordance;

determine, for each of the at least one item of data, a score S representative of a discriminative power of that the at least one item of data, wherein the score is calculated using a formula $S=(I_1^{1.5}-I_2^{1.5})/(I_1+I_2)$; wherein $I_1$ is the first score and $I_2$ is the second score;

determine a first plurality of items of data appearing in records of the first group;

determine a second plurality of items of data appearing in records of the second group; and generate a displayable user interface representative of the first plurality of words and the second plurality of words such that each of the first plurality of words share a common trait so as to be distinguishable from each of the second plurality of words, wherein;

the user interface includes a first view comprising data representative of the first group and the second group, and the user interface includes at least one further view comprising data representative of data representative of the records in different formats, the dual word cloud includes the first plurality of words relating to the first group of records that comply with a particular query, the dual word cloud includes the second plurality of words relating to the second group of records that do not comply with the query, and the dual word cloud includes both words having high discriminative powers for the records of the first group and the second group, and all views are updated upon user selection of at least one item of data in one of the views.

\* \* \* \* \*